E. DRAKE.

METHOD OF UNITING THE SOLES AND UPPERS OF BOOTS AND SHOES.

No. 7,155. Reissued June 6, 1876.

Witnesses:

J. Westhagner

J. A. Rutherford

Inventor:

Ellis Drake by Johnson and Johnson

Attys.

N. PETERS, PHOTO-LITHOGRAPHER, WASHINGTON, D. C.

UNITED STATES PATENT OFFICE.

ELLIS DRAKE, OF STOUGHTON, MASSACHUSETTS, ASSIGNOR, BY MESNE ASSIGNMENTS, TO THE DRAKE SEWING MACHINE COMPANY.

IMPROVEMENT IN THE METHODS OF UNITING THE SOLES AND UPPERS OF BOOTS AND SHOES.

Specification forming part of Letters Patent No. 155,932, dated October 13, 1874; reissue No. 7,155, dated June 6, 1876; application filed May 17, 1876.

DIVISION B.

*To all whom it may concern:*

Be it known that I, ELLIS DRAKE, of Stoughton, in the county of Norfolk and State of Massachusetts, have invented a new and useful Improvement in the Art of Uniting the Soles and Uppers of Boots and Shoes, Harness-Making, and the like, of which the following is a specification:

In a division (A) of this patent I have shown and described a sewing-machine constructed and adapted for forming my new stitch, and such machine need not, therefore, be described herein.

In uniting the soles and uppers in the manufacture of boots and shoes by the ordinary chain-stitch, the needle, while forming the stitch, occupies a portion of the space of the hole, and consequently either the thread forming the stitch has considerable play in the leather, or the space left by the withdrawal of the needle is filled in part by wax, or other adhesive substance, and the work is not satisfactory—first, because the needle-holes are liable to allow the entrance of water into the shoe; second, when the ends of the loops become worn off, the portion of the thread in the space or hole is liable to be drawn out, and, as a consequence, the work is liable to come to pieces; third, the loops occupy so much space upon the surface of the sole that it is necessary to cut a comparatively wide and deep channel to receive them, and in so doing a considerable portion of the wearing-surface of the hole is destroyed, besides rendering the boot or shoe very undesirable when the lip of the channel becomes started up, and, finally, the stitch lacks firmness and compactness, which are very necessary to insure the durability of hand-sewed work.

The object of my invention is to remedy these objections by the formation of a stitch which shall fully and absolutely fill up and occupy the space of the hole formed by the needle, and become, in fact, an elastic peg of four strands, and having only a single thread exposed upon both surfaces.

Figure 1:
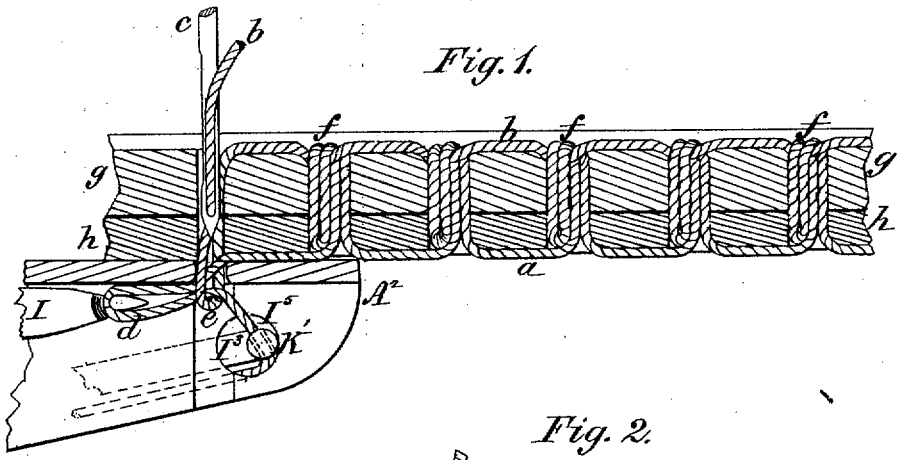
Figure 2:
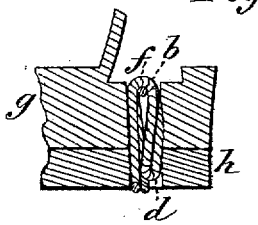
Figure 3:
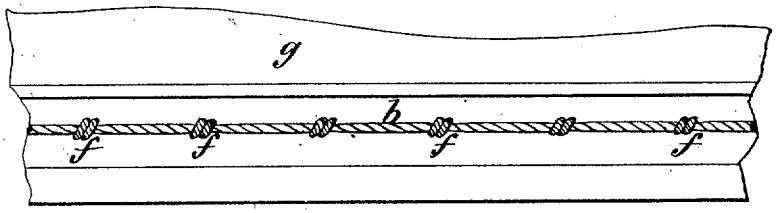

In the accompanying drawings, Figure 1 represents a sectional view, showing the formation of the stitch in uniting the work; Fig. 2, a cross-section thereof through one of the stitches; and Fig. 3, a portion of the bottom of a boot or shoe sole, showing the appearance of the stitch in the channel.

The stitch is formed by the lower thread *a*, the upper or needle thread *b* serving as the carrier for this lower or stitch thread. This is done by first passing the upper thread *b* through the work by means of an eyed needle, *c*, and then drawing a loop, *d*, of the under thread *a* through the loop *e* of the upper thread *b*, formed by the recession of the needle. The under thread is then released by the forward movement of the looper I, and is drawn up into the work by the return of the needle-thread in the form of four strands, and in which the looped ends of the loop *d* proper is suspended at the point *f* in the needle-hole by the needle-thread, as shown in the drawings.

It will be perceived that the stitch thus formed will present but one thread on each surface of the work, giving the appearance of hand-sewed work, while the strands of the stitch in the needle-hole will consist of four threads, and completely and absolutely fill the hole formed by the needle, and will be so packed or crowded therein as to securely and firmly bind the work together. The quadrupling of the under thread forms the embedded fastening, the needle-thread merely serving as its carrier, and this stitch can be formed by mechanism sufficiently small to be inserted and extend within and to any part of the interior of a boot or shoe, as shown in Division A of this patent.

The needle *c*, in piercing the work, of which *g* and *h* may represent the outer and inner soles, takes with it the upper or carrier thread *b*, and when through the material the needle slightly recedes, and forms thereby the slack loop *e*, through which a looper, I, passes, and, engaging with the under thread *a*, causes the loop *d* to be formed within and through the slack loop *e* of the needle-thread, and of a length or distance from the needle-loop corresponding with the thickness of the stock or material being united. The needle then completes its recession, and, by means of its slack loop *e*, lifts or draws up the doubled-under thread in the form of four strands into the hole made by the needle, until said slack-lifting loop has drawn the loops into the required position in the work by the proper tension of the needle-thread and recession of the needle, and by the action of the feed device during the latter part of the receding movement of the needle the desired spaces between the stitches are made, laying the two surface-threads with the desired tautness. The stitch thus formed in effect becomes an elastic peg or quadrupled fastening, and will fully and entirely perform its function, even when the needle-thread is entirely worn off, or when the four strands are separated at their loop ends by the wearing down of the sole, as the threads have been so thoroughly wedged in as to possess all the durability and strength of pegged or hand-sewed work. The threads, being waxed, and when multiplied as described in the work, and secured by the wax, make a fastening of superior strength.

In uniting the soles and uppers by conveying the staple of a stitch from the exterior directly to the interior of a boot or shoe, the employment of a chain-stitch is the only stitch heretofore known which is formed by mechanism for producing the same, and a reference to the construction and position of such chain-stitch will readily show that a large proportion of the thread is consumed on the upper surface of the work; whereas in my plan of stitch it is almost entirely embedded in the body of the work, leaving only a single strand on both surfaces of the work, and by this means I am enabled to utilize the surplus surface length of thread of the chain-stitch by more completely filling the needle-hole.

The stitch-thread *a* may be carried by a guide, K′, co-operating with the looper.

I claim—

A method of uniting pieces of leather by a stitch completely filling the hole, formed by passing the loop *d* of the under thread *a* through the loop *e* of an upper thread, *b*, first brought down through the work, the loop of the upper thread being then drawn back to the desired position, carrying the quadrupled lower thread with it into the work, substantially as described.

In testimony whereof I have affixed my signature in the presence of two witnesses.

ELLIS DRAKE.

Witnesses:

A. E. H. JOHNSON,

J. W. HAMILTON JOHNSON.